United States Patent
Qiao et al.

(10) Patent No.: US 11,899,721 B2
(45) Date of Patent: Feb. 13, 2024

(54) GRAPH-BASED MULTI-THREADING GROUP DETECTION

(71) Applicant: PAYPAL, INC., San Jose, CA (US)

(72) Inventors: Zhenyu Qiao, Shanghai (CN); Jie Huang, Shanghai (CN); Jun Gu, Shanghai (CN); Si Feng, Shanghai (CN); Yunjing Dai, Shanghai (CN)

(73) Assignee: PayPal, Inc., San Jose, CA (US)

( * ) Notice: Subject to any disclaimer, the term of this patent is extended or adjusted under 35 U.S.C. 154(b) by 81 days.

(21) Appl. No.: 17/509,854

(22) Filed: Oct. 25, 2021

(65) Prior Publication Data

US 2023/0131051 A1   Apr. 27, 2023

(51) Int. Cl.
  *G06F 16/901*  (2019.01)
  *G06F 16/903*  (2019.01)
  *G06F 9/48*  (2006.01)
  *G06F 21/31*  (2013.01)
  *G06F 9/52*  (2006.01)

(52) U.S. Cl.
  CPC ........ *G06F 16/9024* (2019.01); *G06F 9/4881* (2013.01); *G06F 9/52* (2013.01); *G06F 16/90335* (2019.01); *G06F 21/316* (2013.01); *G06F 2221/2141* (2013.01)

(58) Field of Classification Search
  CPC ........... G06F 16/9024; G06F 16/90355; G06F 9/4881; G06F 9/52; G06F 21/316; G06F 2221/2141

USPC ....................................................... 707/798
See application file for complete search history.

(56) References Cited

U.S. PATENT DOCUMENTS

| | | | |
|---|---|---|---|
| 11,349,857 B1 * | 5/2022 | Shah | G06F 16/2379 |
| 2013/0297632 A1 * | 11/2013 | Cohen | G06F 16/9024 |
| | | | 707/E17.011 |
| 2020/0259840 A1 * | 8/2020 | Badawy | G06F 21/45 |
| 2021/0117978 A1 * | 4/2021 | Silva | G06Q 20/4016 |
| 2023/0054704 A1 * | 2/2023 | Ghalaty | G06F 16/906 |

* cited by examiner

*Primary Examiner* — Robert W Beausoliel, Jr.
*Assistant Examiner* — Lauren Zannah Ganger
(74) *Attorney, Agent, or Firm* — Haynes and Boone, LLP

(57) ABSTRACT

Methods and systems are presented for detecting groups within a graph using computer-based multi-threading techniques. These techniques provide technical improvements in computing power and efficiency for analysis of large graphs. A group detection system accesses a graph. Threads are instantiated to perform task related to a group detection process based on the nodes in the graph, where a thread is instantiated for a corresponding node. Each thread determines a neighbor count representing a number of neighbor nodes having one degree of separation from the corresponding node. Each thread also generates a list comprising an identity of the corresponding node and identities of the neighbor nodes. The thread transmits the list only to threads corresponding to a first subset of the neighbor nodes having more neighbors than the corresponding node, but not to threads corresponding to a second subset of the neighbor nodes having less neighbors than the corresponding nodes.

20 Claims, 7 Drawing Sheets

US 11,899,721 B2

GRAPH-BASED MULTI-THREADING GROUP DETECTION

BACKGROUND

The present specification generally relates to computer-based graph analytical techniques, and more specifically, to providing a computer-based multi-threading solution for analyzing graphs according to various embodiments of the disclosure.

RELATED ART

Graphs have been widely used in computer science as a data structure for representing relationships among entities due to the ease of visualizing and analyzing the entities using such a data structure. For example, a graph may be constructed to represent relationships among users. By analyzing a graph, entities (e.g., users, user accounts, employees, etc.) that are related to each other may be determined, such that groups can be formed among the related entities (e.g., users that are within the same social circle within a social media platform, user accounts that share common attributes, employees that are within the same department, etc.). Actions may then be performed, based on the determined groups, to improve a computer system. For example, a group of user accounts may be determined to be malicious user accounts based on the determined relationships among the user accounts within the group. Additional network security may then be imposed on such user accounts, such as re-configuring a log-in protocol for the user accounts, limiting access to certain services for the user accounts, etc.

However, as a graph becomes large and complicated, possibly due to a large number of entities and/or complexities of different relationships among the entities, it becomes technically challenging for a computer system to analyze the graph. In some instances, it may take a long amount of processing time and memory resources for the computer system to analyze the graph. In some instances, the computer system may even fail to complete the task of analyzing the graph due to technical issues such as running out of computer memory space. Thus, Applicant recognizes that there is a need for providing an improved computer-based solution for efficient analysis of large graphs.

Figure 1:
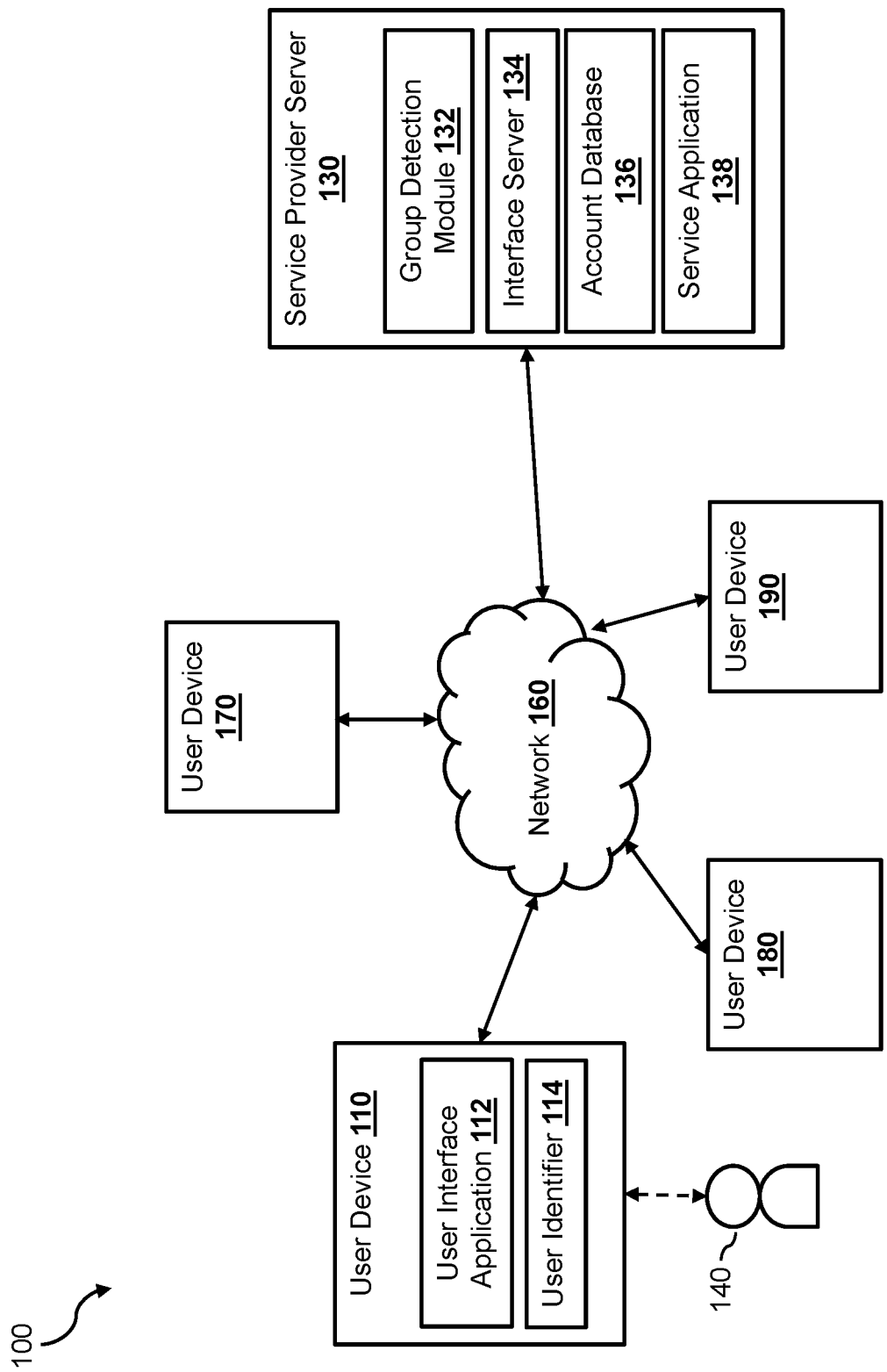
FIG. 1 is a block diagram illustrating a networked system that includes an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for performing group detection in graphs using computer-based multi-threading techniques. A graph is a data structure that can be used for representing relationships among different entities (e.g., users, user accounts, employees, etc.). For example, a graph may include nodes representing the different entities. Connections (also referred to as "edges") between the nodes may then be used to represent relationships between the corresponding entities. Edges can be used to represent different types of relationships depending on the goal of the group detection process and/or the nature of the graph.

As discussed herein, some types of computer-based graph analysis solutions may perform graph analyses adequately when a graph is sufficiently small (e.g., when the number of nodes and/or the number of edges in the graph are below a threshold). However, when the graph is sufficiently large (e.g., when the number of nodes and/or the number of edges in the graph are above the threshold), the performance of analyzing the graph using the conventional graph analysis solutions may be substantially degraded (e.g., consuming a long time and/or requiring a large amount of computer memory and/or processing resources to analyze the entire graph). For example, the conventional solutions may use a single computer process to analyze the graph. Thus, the time to process the entire graph may be proportional (e.g., linearly, exponentially) to the number of nodes in the graph. Furthermore, the computer solution may require a proportional amount of computer memory during the analysis of the graph. When the graph is sufficiently large, a computer device may fail to complete the task due to technical issues such as running out of computer memory space during the processing of the graph. Thus, a graph analysis algorithm that functions adequately for a graph of 1,000 nodes may be incapable of analyzing a graph of ten million nodes, for example.

Thus, according to various embodiments of the disclosure, a group detection system may use multi-threading techniques to detect groups within a graph. By using such multi-threading techniques, the group detection system may provide substantial improvements in processing time and memory usage in group detections over conventional solutions. As defined herein, a group includes two or more nodes within a graph that are connected with each other directly or indirectly. In some embodiments, instead of using a single computer process to perform group detection for a graph, the group detection system may instantiate multiple software executable threads (also referred to as "threads") that collaborate together to perform the group detection process. In some embodiments, the group detection system may instantiate a thread for each node within the graph. The group detection system may also configure each thread to perform a set of corresponding group detection tasks based on the corresponding node. The set of corresponding group detection tasks may include computations that can be performed based on data associated with the corresponding node. For example, an instantiated thread corresponding to a particular node may identify, for the particular node, the identities of the neighbor nodes and may generate a list of the neighbor identities.

In some embodiments, each instantiated thread may also collaborate with one or more other threads as part of the group detection process. For example, the instantiated thread may transmit the list of neighbor identities to the neighbor nodes. Since each thread may transmit its own list of neighbor identities to its neighbor nodes, each instantiated thread may also receive lists of neighbor identities from the neighbor nodes. Upon receiving lists of neighbor identities from the neighbor nodes, the instantiated thread may compare its own generated list of neighbor identities against the lists of neighbor identities received from other threads. If the neighbor identities of a neighbor node form a subset of the neighbor identities of the particular node, the thread may determine that the neighbor node is part of a group associated with the particular node, and not any other group. Thus, the thread may terminate the other thread corresponding to the neighbor node because no other group can be detected by the other thread corresponding to the neighbor node. Each thread may independently perform the comparison and may terminate other threads until all of the groups within the graph are detected.

Since each thread may perform certain steps in the group detection tasks independently and in parallel with each other, the computation time for performing the group detection process using the multi-threading techniques as disclosed herein is improved over conventional solutions using a single process for performing the group detections. Furthermore, the communications and comparison of data among different threads enable accurate and efficient detection of groups within the graph.

In some embodiments, in order to further improve the performance of the computer-based group detection process, the group detection system may further reduce unnecessary data transmission and comparison operations during the group detection process. For example, instead of transmitting the list of neighbor identities to threads corresponding to all of the neighbor nodes, the thread may be configured to transmit the list of neighbor identities to neighbor nodes that have more neighbors than the node corresponding to the thread. For example, the thread may determine a neighbor count representing a number of neighbor nodes of the corresponding node. Neighbor nodes of the corresponding node are nodes having one degree of separation (e.g., directly connected via a single edge) from the corresponding node. The thread may transmit initially, only the neighbor count to the threads corresponding to the neighbor nodes. Since every thread is configured to transmit its neighbor count to other threads corresponding to its neighbor nodes, the thread may receive neighbor counts from the threads corresponding to the neighbor nodes. The thread may then compare its neighbor count against the neighbor counts received from the other threads. After comparing the neighbor counts, the thread may be configured to transmit the list of neighbor identities associated with the particular node only to threads corresponding to neighbor nodes that have larger neighbor counts than the particular node, and not to other threads corresponding to other neighbor nodes that have smaller neighbor counts than the particular node. This way, many of the steps that require larger computer processing resources, such as transmitting of lists of neighbor identities and comparisons of lists of neighbor identities, can be eliminated. Although each thread is now required to perform additional steps of transmitting the neighbor counts and comparing the neighbor counts, these additional steps require much less computer processing resources than the eliminated steps because the computer resources required to transmit single values (e.g., neighbor counts) and compare two single values (e.g., two neighbor counts) are substantially less than the computer resources required to transmit lists of neighbor identities (especially when each list of neighbor identities may include a large number of identifies) and comparing two lists of neighbor identities (each comparison of two lists of neighbor identities involve comparisons of multiple pairs of values). Thus, the improved group detection process provides further performance enhancements.

In some embodiments, in addition to transmitting the neighbor count to threads corresponding to the neighbor nodes of the particular nodes, the thread may also be configured to generate a hashed value based on the identities of the neighbor nodes, and transmit the hashed value to the neighbor nodes. When the thread determines that its own generated neighbor count equals to a neighbor count received from another thread corresponding to a neighbor node of the particular node, the thread may compare its own generated hashed value against a hashed value received from that other thread. If the hashed value is equal, the thread may determine that the two nodes (e.g., the particular node and the neighbor node) share the same neighbors. As such, the group detection system may terminate one of the two threads as only one thread is needed to detect this group of connected nodes. The use of the hashed value to determine whether two nodes share the same set of neighbor nodes when both nodes have the same neighbor count is efficient because the operation of comparing two hashed values requires substantially less computer process resources than comparing two lists of neighbor identities.

FIG. 1 illustrates a networked system 100, within which the group detection system may be implemented according to one embodiment of the disclosure. Note that the present techniques may be applied in many different computing and technological environments, however, and are not limited to those shown in the figures. The networked system 100 includes a service provider server 130 and user devices 110, 170, 180, and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 over the network 160. For example, the user 140 may log in to a user account to access account services or conduct electronic transactions (e.g., account transfers or payments, purchasing goods and/or services, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant server 120 and/or the service provider server 130 over the network 160. In one implementation, the user interface application 112 includes a software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user 140 with a particular user account, a particular digital wallet, and/or a particular profile.

In various implementations, the user 140 is able to input data and information into an input component (e.g., a keyboard) of the user device 110. For example, the user 140 may use the input component to interact with the UI application 112 (e.g., to retrieve content from third-party servers such as the service provider server 130, etc.).

Each of the user devices 170, 180, and 190 may include similar hardware and software components as the user device 110 to enable their respective users to interact with the service provider server 130 through the user devices 170, 180, and 190. For example, the users of the user devices 110, 170, 180, and 190 may use the respective devices to conduct electronic transactions (e.g., cryptocurrency transactions) through different user accounts of the service provider server 130.

The service provider server 130, in one embodiment, may be maintained by a transaction processing entity or an online service provider, which may provide processing for electronic transactions between different entities (e.g., among the users of the user devices 110, 170, 180, and 190), between a user and one or more business entities, or other types of payees. As such, the service provider server 130 may include a service application 138, which may be adapted to interact with the user devices 110, 170, 180, and 190, over the network 160 to facilitate the searching, selection, purchase, payment of items, and/or other services offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities (e.g., between two users, etc.). In one implementation, the payment processing application assists with resolving electronic transactions through validation, delivery, and settlement. As such, the payment processing application settles indebtedness between users and/or between a user and a merchant, wherein accounts may be directly and/or automatically debited and/or credited of monetary funds.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various services provided by the service provider server 130. The interface server 134 may also include other electronic pages associated with the different services (e.g., electronic transaction services, etc.) offered by the service provider server 130. As a result, a user (e.g., the user 140, users of the user devices 170, 180, and 190, etc.) may access a user account associated with the user and access various services offered by the service provider server 130, by generating HTTP requests directed at the service provider server 130. In some embodiments, the fragment module integration framework may be implemented within or in association with the interface server 134.

The service provider server 130, in one embodiment, may be configured to maintain one or more user accounts in an account database 136, each of which may be associated with a profile and may include account information associated with one or more individual users (e.g., the user 140 associated with user device 110, users associated with the user devices 170, 180, and 190). The account information may include an identifier of the user account, and other information associated with the user such as a gender, an age, demographic information, device information associated with devices associated with the user (e.g., a device identifier, an Internet Protocol (IP) address of the device, a residential address, an operating system version, screen attributes of the device, etc.). In one implementation, a user may have credentials to authenticate or verify identity with the service provider server 130. Thus, the service provider server may store the credentials of the users in corresponding records of the account database 136 associated with the user accounts. In some embodiments, the account database 136 may also store transaction data associated with transactions that have been conducted by users of the service provider sever 130. The transaction data may include a transaction amount, device information associated with a device used by the user to conduct the transaction, merchant (or payee) information, item purchased, etc.

In various embodiments, the service provider server 130 includes a group detection module 132 that implements the group detection system as discussed herein. In particular, the group detection module 132 may analyze user accounts with the service provider server 130 and perform actions to the user account based on the analyzing the user accounts. In some embodiments, instead of analyzing each user account independently (e.g., analyzing activities conducted through each individual user account independent of other user accounts, etc.), it may be desired to analyze groups of related user accounts collectively, as if the activities conducted through the groups of related user accounts were conducted through a single user account. It is because various entities (e.g., a household, an organization such as a business or a criminal organization, etc.) may create multiple accounts to conduct activities for the same entities. For example, each member of a household may be associated with a different user account with the service provider server 130. The members of the same household may conduct activities for the household (e.g., purchasing items for the household, etc.). In one example, the mother and the father of the household may separately purchase various items that are all for a birthday party for their child. Thus, analyzing the activities conducted through the user accounts of both the mother and the father would provide additional insights for the service provider server 130 to perform actions (e.g., provide recommendations, provide incentives, etc.) for the user accounts of the household as a single entity.

In another example, a criminal organization may create multiple user accounts for the purpose of defrauding other users of the service provider server 130 and/or launching a cyberattack on the service provider server 130. In order to evade detection, the criminal organization may use different accounts to perform different tasks, that individually, the activities conducted through each account may not exceed a threshold that would alert the service provider server 130, but collectively may accomplish the criminal activity. In a specific example, the criminal organization may use each user account to conduct a fraudulent dispute in a small amount (e.g., an amount that is less than a threshold such as $50). The dispute at that amount may not have alerted the service provider server 130 as a potential malicious activity. However, the criminal organization may have created multiple (e.g., 50, 100, etc.) user accounts with the service provider server 130. When each of the user accounts is used the conduct a fraudulent dispute within a short period of time (e.g., a week, etc.), even though each dispute is for a small amount, the pattern of activities for those user accounts as a whole may allow the service provider server 130 to determine that the user accounts were used for malicious purposes.

As such, the group detection module 132 may be configured to identify various groups of related user accounts with the service provider server 130, and may perform analyses on each group of user accounts as a whole. In order to identify the various groups of related user accounts, the group detection module 132 of some embodiments may generate a graph representing the user accounts and relationships among the user accounts. Depending on a goal or an objective of the group detection process, the group detection module 132 may connect the nodes in the graph based on different relationships among the corresponding user accounts. For example, the group detection module 132 may generate a graph that connects a pair of nodes with an edge based on one or more previous transactions conducted between the corresponding two user accounts within a period of time. In another example, the group detection module 132 may generate a graph that connects a pair of nodes with an edge based on a common attribute value corresponding to a predetermined set of attributes (e.g., IP addresses, residential addresses, device identifiers, etc.) between the two corresponding user accounts.

After generating the graph representing the user accounts, the group detection module 132 may use the multi-threading techniques as disclosed herein to detect one or more groups within the graph. Each group includes two or more nodes in the graph that are connected with each other directly or indirectly via one or more edges. Based on the detected group, the group detection module 132 may perform one or more actions on the user accounts within the group. For example, if the group detection module 132 is configured to detect groups of malicious user accounts, the group detection module 132 may analyze the activities (e.g., electronic transactions, online activities, etc.) conducted through the user accounts within the same group. The group detection module 132 may determine that a group of user accounts is used to conduct malicious activities based on the activities conducted through the user accounts within the group collectively. The group detection module 132 may then adjust an access level for the groups of malicious user accounts, for example, increasing the security requirements for the login protocols, limit transaction amounts, limit access to certain services or functionalities of the service provider server 130, etc. If the group detection module 132 is configured to detect groups of members within the same household, the group detection module 132 may generate recommendations and/or incentives for the user accounts within a group based on activities conducted through the user accounts within the same group.

Figure 2:
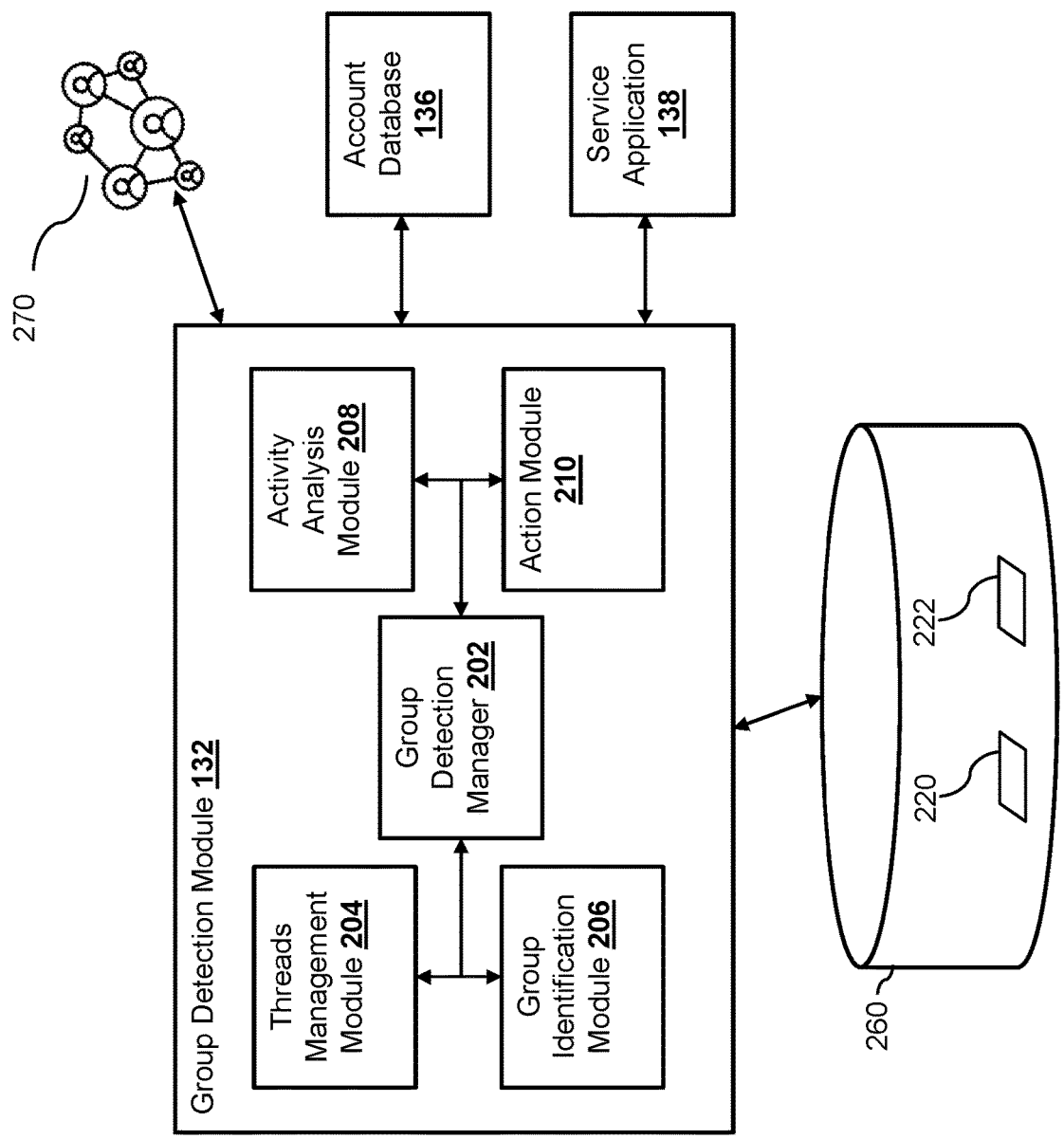
FIG. 2 is a block diagram illustrating a group detection module according to an embodiment of the present disclosure.

FIG. 2 illustrates a block diagram of the group detection module 132 according to an embodiment of the disclosure. The group detection module 132 includes a group detection manager 202, a threads management module 204, a group identification module 206, an activity analysis module 208, and an action module 210. In some embodiments, the group detection manager 202 may access data associated with various user accounts with the service provider server 130 from the account database 136. For example, the group detection manager 202 may access various attribute values corresponding to the predetermined set of attributes (e.g., IP addresses, residential addresses, device identifiers, etc.). In another example, the group detection manager 202 may access transaction histories associated with the various accounts with the service provider server 130.

The group detection manager 202 may then generate a graph 270 for representing the user accounts with the service provider server 130 and relationships among the user accounts. For example, the graph detection manager 202 may create nodes for representing the user accounts with the service provider server 130 in the graph 270, where each node represents a distinct user account with the service provider server 130. The group detection manager 202 may also connect nodes in the graph 270, that are determined to be related based on the attribute values of the corresponding user accounts and/or the transaction history of the corresponding user accounts, with edges.

As discussed herein, the group detection module 132 may be configured to perform a group detection process in a graph (e.g., the graph 270) using a multi-threading approach. Under the multi-threading approach, instead of using a single computer software process to perform the group detection process, the group detection module 132 may use multiple computer software threads (also referred to as "threads") to perform the group detection process collaboratively. Each computer software thread comprises a sequence of computer programmed instructions that can be managed independently by a scheduler of an operating system. Due to the nature of threads, they can be instantiated by a computer process to perform tasks concurrently (e.g., in parallel with each other).

In some embodiments, the threads management module 204 may instantiate multiple computer software threads for performing tasks related to the group detection process. For example, the threads management module 204 may instantiate a thread for every node in the graph 270. Each instantiated thread may be configured to perform a set of tasks related to the group detection process based on the corresponding node. Based on the performance of the tasks, the group identification module 206 may determine one or more groups of related nodes within the graph 270. The group identification module 206 may store information associated with the groups of related nodes within the data storage 260. For example, the group identification module 206 may store a group identifier (e.g., the group identifiers 220, 222, etc.) for each of the identified groups of nodes within the graph 270, and may associate user account identifiers that correspond to the nodes within the identified groups with the corresponding group identifiers.

In some embodiments, the activity analysis module 208 may analyze activities conducted through multiple user accounts associated with the same group collectively. In some embodiments, the activity analysis module 208 may treat all of the user accounts with the same group as a single user account (or a single entity), and analyze the activities conducted through the user accounts within the group as activities conducted through a single user account. The activity analysis module 208 may derive a pattern (e.g., preference of certain types of items, conducting similar transactions, etc.), a trend (e.g., an increase of certain transactions, etc.), or a classification (e.g., high spender who perform transactions over a threshold amount with a period of time such as a week, etc.).

Based on the derived pattern, trend, and/or classification, the action module 210 may perform actions on user accounts that have been associated with one or more groups by the group identification module 206. For example, if it is determined that the user accounts associated with a group are linked to malicious (e.g., criminal or fraudulent) activities, the action module 210 may cause the service application 138 to adjust a security setting for the user accounts, such as adjusting a log-in protocol for accessing services through the user accounts, suspending the user accounts, limiting access to certain services through the user accounts, etc. In another example, if it is determined that the user accounts associated with a group are linked to the same household (or an entity such as a business), the action module 210 may generate recommendations and/or incentives for those user accounts based on the activities conducted through the user accounts collectively.

Figure 3:
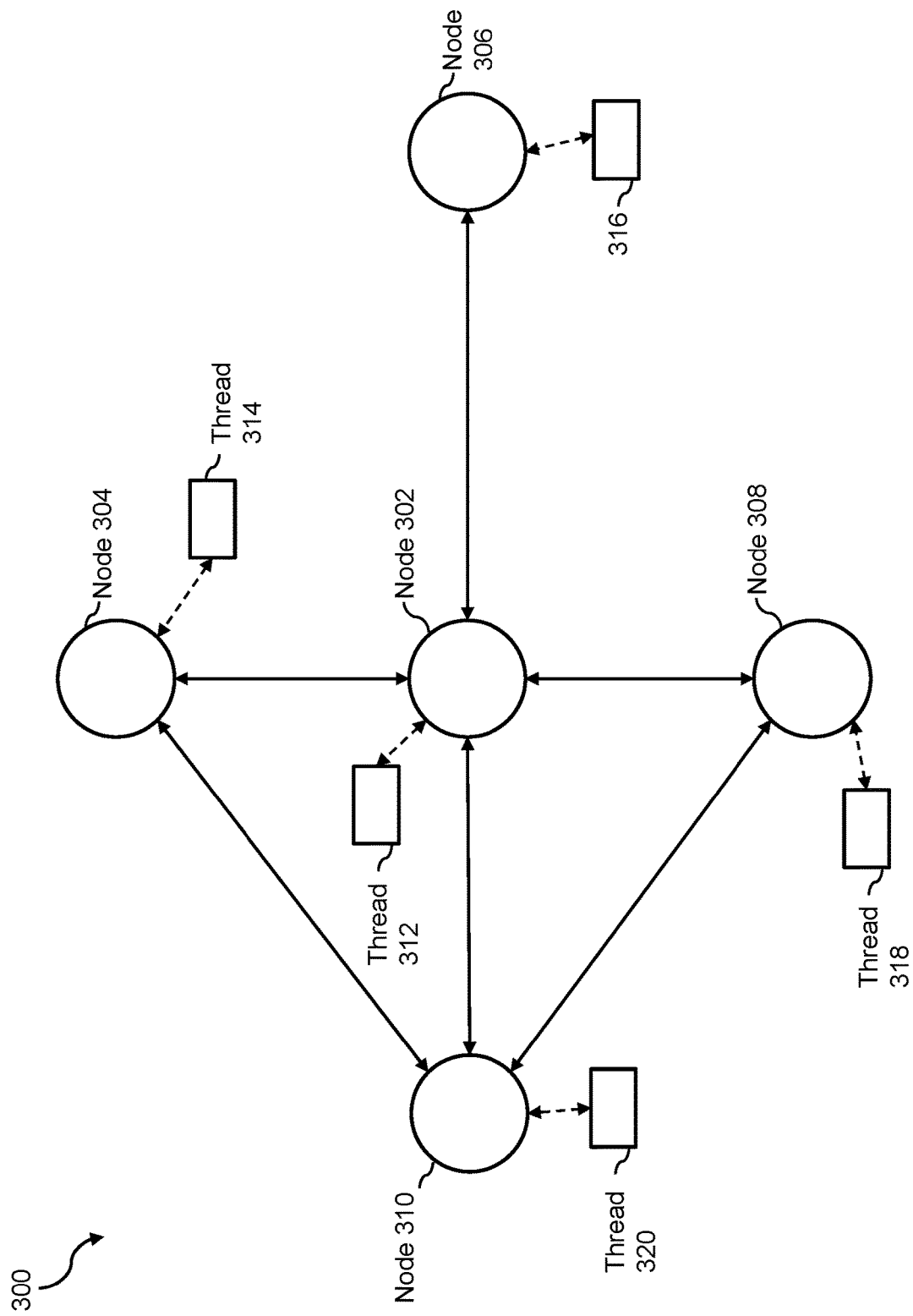
FIG. 3 illustrates an example graph according to an embodiment of the present disclosure.

FIG. 3 illustrates an exemplary graph 300 generated by the group detection module 132 according to various embodiments of the disclosure. The graph 300 is shown to include only five nodes 302, 304, 306, 308, and 310 representing five user accounts with the service provider server 130 for illustrating embodiments of the disclosure. However, the techniques described herein can be applied to graphs with additional nodes. It is noted that the performance improvement can be achieved in a larger proportion using the techniques described herein when the graph is large. For example, the group detection process can be performed using the techniques described herein for a graph as large as thousands of nodes when a conventional group detection process would fail to perform or complete due to technique issues such as running out of memory space. As such, the graph 300 may be a portion of the graph 270 generated by the group detection module 132.

In this example, the nodes 302 and 310 are connected via an edge in the graph 300, indicating that the user accounts represented by the nodes 302 and 310 are related (e.g., the user accounts share a common attribute value, such as an IP address, one or more transactions conducted between the two user accounts, etc.). Similarly, the nodes 302 and 304 are connected via an edge, indicating that the user accounts represented by the nodes 302 and 304 are related. The nodes 302 and 308 are connected via an edge, indicating that the user accounts represented by the nodes 302 and 308 are related. The nodes 302 and 306 are connected via an edge, indicating that the user accounts represented by the nodes 302 and 306 are related. The nodes 304 and 310 are connected via an edge, indicating that the user accounts represented by the nodes 304 and 310 are related. The nodes 308 and 310 are connected via an edge, indicating that the user accounts represented by the nodes 308 and 310 are related.

As discussed herein, in some embodiments, the threads management module 204 may instantiate computer software threads for performing tasks related to the group detection process based on the nodes within the graph 300. As such, the threads management module 204 may instantiate threads 312, 314, 316, 318, and 320, each corresponding to a respective nodes 302, 304, 306, 308, and 310. Each of the threads may be configured to perform tasks related to the group detection process based on the corresponding node. For example, each thread may be configured to determine a neighbor count representing a number of neighbor nodes having one degree of separation from the corresponding node, based on traversing the graph 300 outward from the corresponding node.

Thus, the thread 312 may determine that the node 302 has a neighbor count of four, the thread 314 may determine that the node 304 has a neighbor count of two, the thread 316 may determine that the node 306 has a neighbor count of 1, the thread 318 may determine that the node 308 has a neighbor count of two, and the thread 320 may determine that the node 310 has a neighbor count of three.

In some embodiments, each thread may be configured to obtain identifiers associated with the neighbor nodes (e.g., node identifiers) and generate a list of identifiers that include the identifier of the corresponding node and the identifiers of the neighbor nodes. For example, the thread 312 may generate, for the node 302 a list of identifiers based on the nodes 302, 304, 306, 308, and 310. The thread 314 may generate, for the node 304, a list of identifiers based on the nodes 302, 304, and 310. The thread 316 may generate, for the node 306, a list of identifiers based on the nodes 302 and 306. The thread 318 may generate, for the node 308, a list of identifiers based on the nodes 302, 308, and 310. The thread 320 may generate, for the node 310, a list of identifiers based on the nodes 302, 304, 308, and 310.

In some embodiments, each thread may generate a hashed value based on the list of identifiers. When generating the hashed value, each thread may be configured to order the list of node identifiers (e.g., the corresponding node identifier and neighbor node identifiers) in a particular order (e.g., ascending order, descending order, alphabetical order, etc.), and may generate the hashed value based on the particular order of the identifiers. As such, if two nodes have the same list of identifiers (e.g., the identifiers of the corresponding node and the neighbor nodes), the threads would generate identical hashed values for the two nodes.

After generating the neighbor count and the hashed value, each thread may transmit the neighbor count and the hashed value to other threads corresponding to the neighbor nodes. Thus, the thread 312 may transmit the neighbor count (e.g., four) and the hashed value generated for the node 302 to the threads 314, 316, 318, and 320 corresponding to the neighbor nodes 304, 306, 308, and 310, respectively. The thread 314 may transmit the neighbor count (e.g., two) and the hashed value generated for the node 304 to the threads 312 and 320 corresponding to the neighbor nodes 302 and 310, respectively. The thread 316 may transmit the neighbor count (e.g., one) and the hashed value generated for the node 306 to the thread 312 corresponding to the neighbor node 302. The thread 318 may transmit the neighbor count (e.g., two) and the hashed value generated for the node 308 to the threads 312 and 320 corresponding to the neighbor nodes 302 and 310, respectively. The thread 320 may transmit the neighbor count (e.g., three) and the hashed value generated for the node 310 to the threads 312, 314, and 318 corresponding to the neighbor nodes 302, 304, and 308, respectively.

Upon receiving the neighbor counts from the threads corresponding to the neighbor nodes, each thread may then determine to which of the threads corresponding to the neighbor nodes to send the list of identifiers. In some embodiments, each thread may be configured to transmit the list of identifiers only to threads corresponding to the nodes having larger neighbor counts, but not to threads corresponding to nodes having the same or smaller neighbor counts. For example, the thread 312 may determine not to transmit the list of identifiers generated for the node 302 to any other thread corresponding to the neighbor nodes 304, 306, 308, and 310, as none of the neighbor nodes has a neighbor count larger than the neighbor count of the node 302. The thread 314 may determine to transmit the list of identifiers generated for the node 304 to the threads corresponding to both of its neighbor nodes 302 and 310, as both of the neighbor nodes 302 and 310 have neighbor counts larger than the neighbor count of the node 304. The thread 316 may determine to transmit the list of identifiers generated for the node 306 to the thread corresponding to its neighbor node 302, as the neighbor node 302 has a neighbor count larger than the neighbor count of the node 306. The thread 318 may determine to transmit the list of identifiers generated for the node 308 to the threads corresponding to both of its neighbor nodes 302 and 310, as both of the neighbor nodes 302 and 310 have neighbor counts larger than the neighbor count of the node 308. The thread 320 may determine to transmit the list of identifiers generated for the node 310 only to the thread corresponding to the neighbor node 302, as only the neighbor node 302 (and not the neighbor nodes 304 and 308) has a neighbor count larger than the neighbor count of the node 310.

Upon receiving one or more lists of identities from the threads of the neighbor nodes, each thread may be configured to compare the list of identities generated for the corresponding node against the one or more lists of identities received from other threads. If the thread determines that a list of identities received from another thread is a subset of the list of identities generated for the corresponding node, the thread may determine that the node corresponding to the other thread from which the list of identities is received belongs to the same group of nodes as the corresponding node, and not any other group. Thus, the thread may determine that the other thread from which the list of identities is received is no longer necessary to perform any additional steps in the group detection process, as that the thread may not identify any other group of nodes. Thus, the thread may transmit a merge request to the other thread, which causes the other thread to terminate.

For example, the thread 320 may receive a list of identities from the thread 318 corresponding to the node 308. The list of identities received from the thread 318 may include the identities of the nodes 302, 308, and 310. The thread 320 may compare that list of identifies (the nodes 302, 308, and 310) against the list of identities generated for the node 310, which includes the identities of the nodes 302, 304, 308, and 310. The thread 320 may determine that the list received from the thread 318 is a subset of the list of identities generated for the node 310, and may transmit a merge request to the thread 308, which causes the thread 308 to terminate. In some embodiments, instead of transmitting the merge request to the other thread (e.g., the thread 308), the thread 320 may transmit the request to the threads management module 204, and the threads management module 204, upon receiving the merge request, may terminate the other thread 308.

Similarly, the thread 312 may receive lists of identities from the threads 314, 316, 318, and 320, and may compare the lists received from the threads 314, 316, 318, and 320 against the list of identities generated for the node 302, which includes the identities of the nodes 302, 304, 306, 308, and 310. Since all of the other lists are subsets of the list of identities generated for the node 302, the thread 312 may cause the other threads 314, 316, 318, and 320 to terminate.

By selectively transmitting the list of identifiers only to certain threads corresponding to a first subset of the neighbor nodes and not to other threads corresponding to a second subset of the neighbor nodes, the group detection process as disclosed herein improves the performance of the group detection process as it reduces the number of lists of identities to be transmitted among threads, and reduces the number of comparison operations performed by each thread.

In some embodiments, if a thread determines that the neighbor count received from another thread corresponding to a neighbor node equals to the neighbor count of the corresponding node, the thread may compare a hashed value received from the other thread against a hashed value generated for the corresponding node. Since the hashed values are generated based on the list of identities, two identical list of identities would generate identical hashed values. Thus, if the thread determines that the hashed value received from the other thread is the same as the hashed value generated for the corresponding node, the thread may transmit a merge request to other thread or may receive a merge request from the other thread. In some embodiments, the threads management module 204 may include a particular logic for determining which thread would send the merge request when the hashed values are the same. For example, the logic may specify that the thread having a corresponding node with a larger node identifier (or a larger corresponding thread identifier) would transmit the merge request, such that the thread with a corresponding node having a smaller node identifier (or a smaller corresponding thread identifier) would terminate.

In some embodiments, the group identification module 206 may determine the remaining threads that are not terminated by other threads, and may receive the lists of identities from the remaining threads. The lists of identities from the remaining threads represent the groups detected within a graph. In this example, the only remaining thread is the thread 312, and the list of identities including the identities of the nodes 302, 304, 306, 308, and 310 represents the only group in the graph 300.

Figure 4:
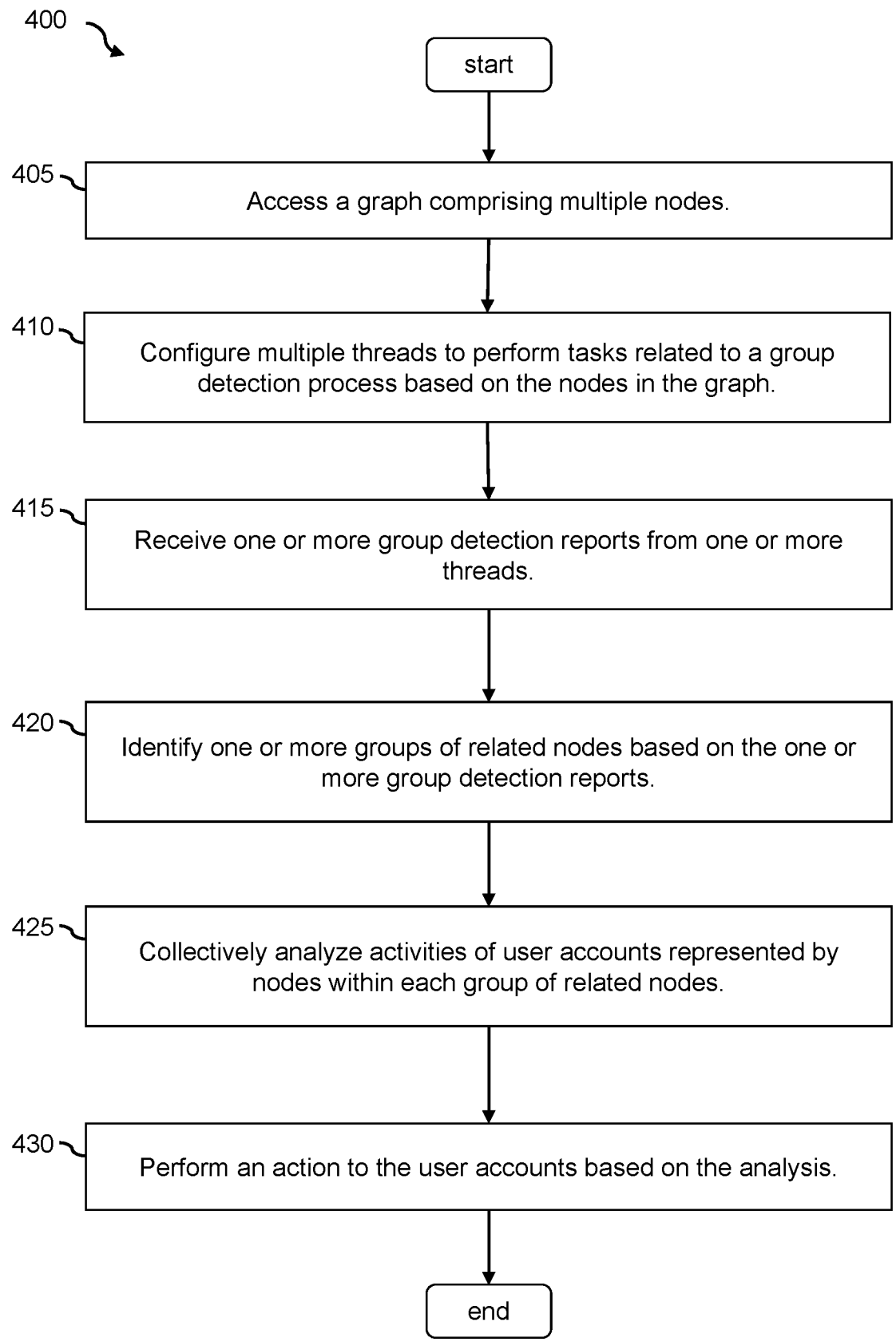
FIG. 4 is a flowchart showing a process of performing a group detection process according to an embodiment of the present disclosure.

FIG. 4 illustrates a process 400 for performing a group detection process based on a graph according to various embodiments of the disclosure. In some embodiments, at least a portion of the process 400 may be performed by the group detection module 132. Any one or more aspects of FIG. 4, FIG. 5A, and/or FIG. 5B may be performed by any suitable computer system, however, according to various embodiments. The process 400 may begin by accessing (at step 405) a graph comprising multiple nodes. For example, the group detection manager 202 may access the graph 270 representing one or more particular types of relationships among user accounts with the service provider server 130. The process then configures (at step 410) multiple threads to perform tasks related to a group detection process based on the nodes in the graph. For example, the threads management module 204 may instantiate multiple threads for performing tasks related to the group detection process for the graph 270. In some embodiments, the threads management module 204 may instantiate a thread for each node in the graph 270, such that each instantiated thread may be configured to perform tasks related to the group detection process based on a corresponding node.

The process 400 receives (at step 415) one or more group detection reports from one or more threads and identifies (at step 420) one or more groups of related nodes based on the one or more group detection reports. As discussed herein, some of the threads may be terminated during the group detection process. The remaining (non-terminated) threads may transmit group detection reports, for example, in the form of the lists of identities that include the identity of the corresponding node and the identities of the neighbor nodes, to the threads management module 204. The group identification module 206 may identify a group within the graph 270 based on each list of identities received from a thread. The group would include nodes having the identities in the list of identities.

The process 400 then collectively analyzes (at step 425) activities of user accounts represented by nodes within each group of related nodes and performs (at step 430) an action based on the analysis. For example, the activity analysis module 208 may analyze activities conducted through user accounts represented by nodes within a group collectively, as if the activities were conducted through a single user account. The activity analysis module 208 may derive a pattern, a trend, or a classification for the user accounts based on the collective analysis of the activities conducted through the user accounts. The action module 210 may then perform actions on the user accounts within a group based on the analysis. For example, if it is determined that the group of user accounts is linked to malicious activities, the action module 210 may change the security settings of the user accounts.

Figure 5A:
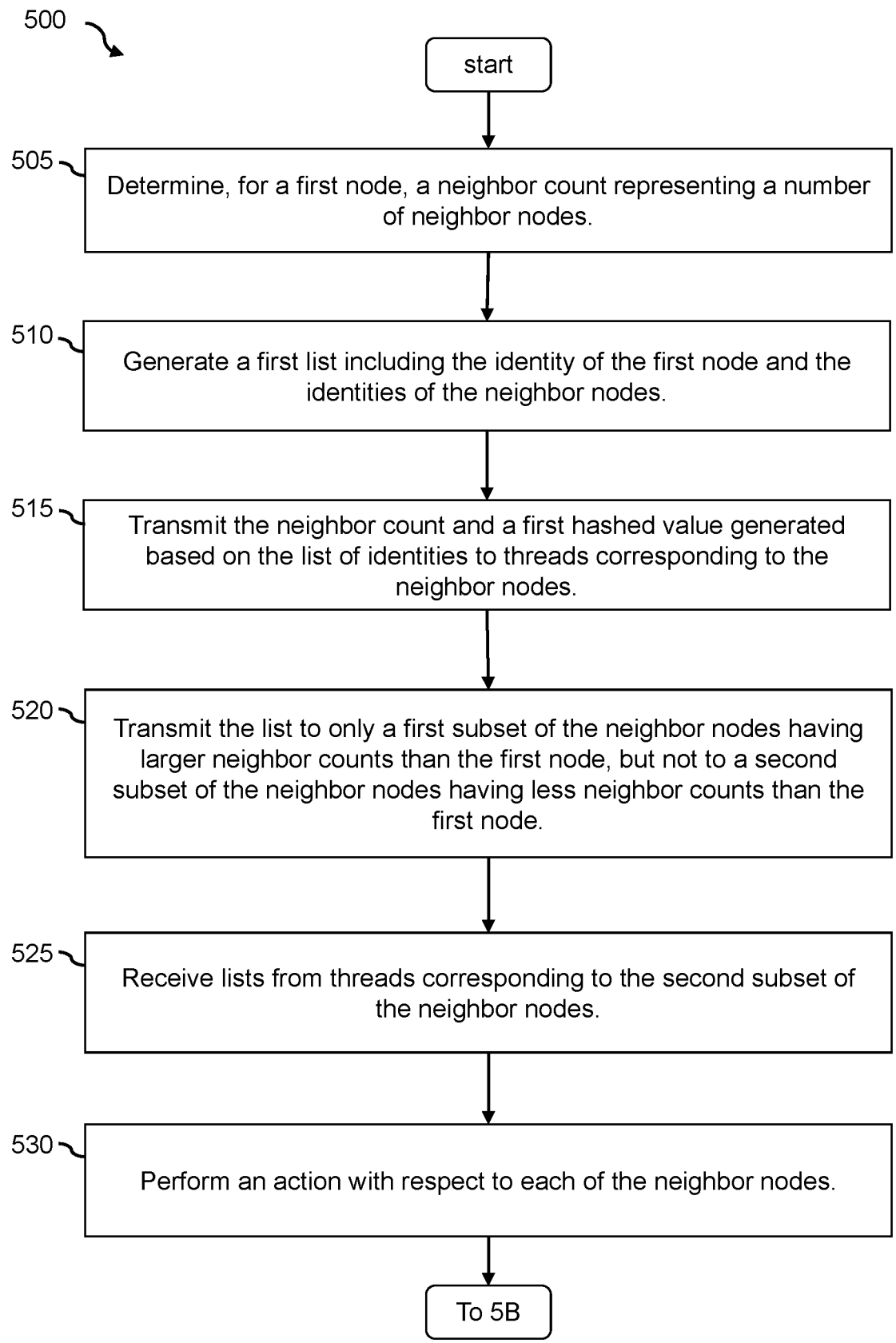
FIGS. 5A and 5B illustrate a flowchart showing a process of performing tasks related to a group detection process performed by an instantiated thread according to an embodiment of the present disclosure.
Figure 5B:
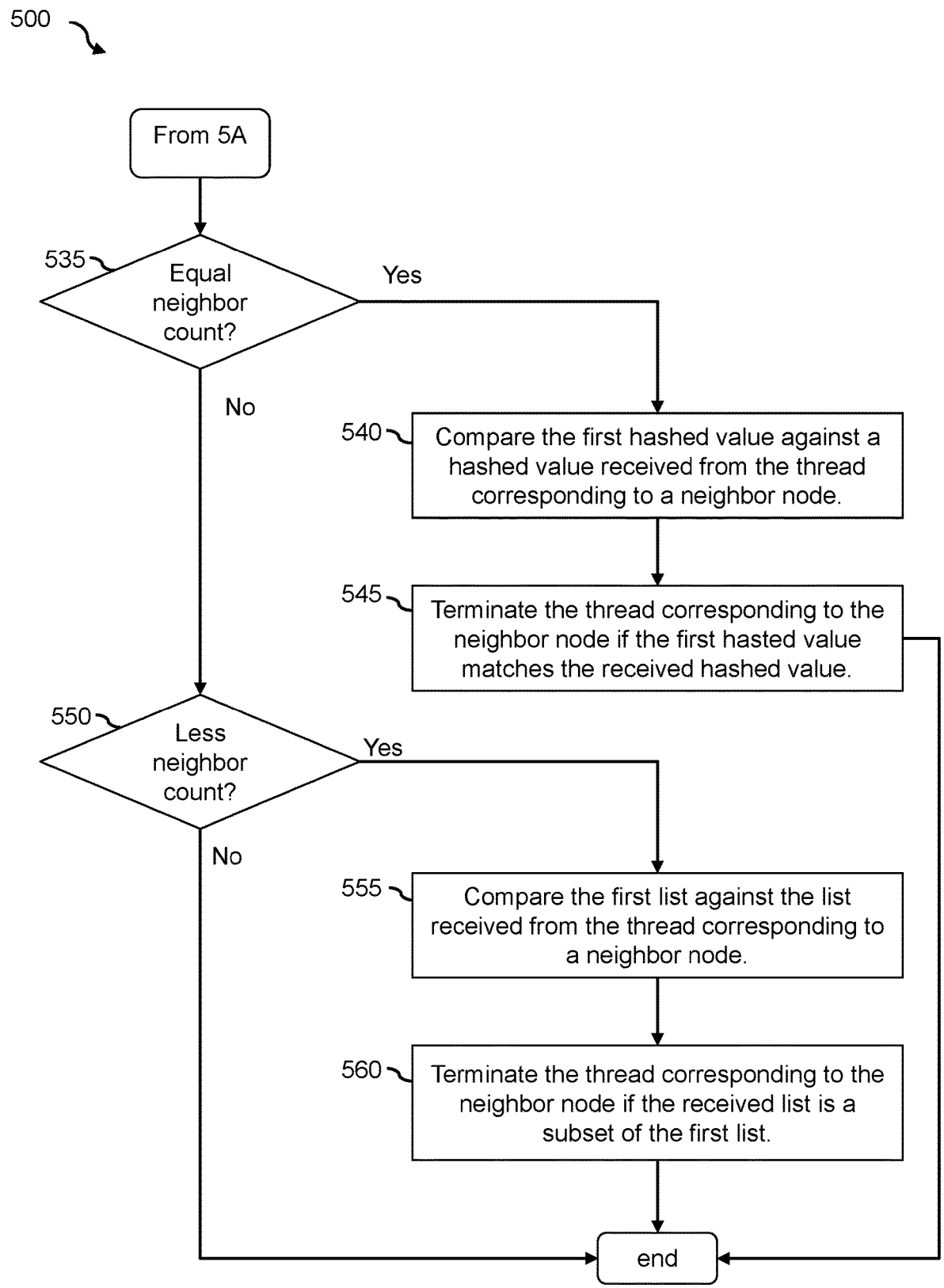

FIGS. 5A and 5B illustrate a process 500 for performing tasks related to a group detection process based on node in a graph according to various embodiments of the disclosure. In some embodiments, at least a portion of the process 500 may be performed by a computer software thread instantiated by the group detection module 132. The process 500 begins by determining (at step 505), for a first node, a neighbor count representing a number of neighbor nodes and generating (at step 510) a first list including the identity of the first node and the identities of the neighbor nodes. For example, the thread 312 may determine, for the node 302, a neighbor count representing a number of neighbor nodes having one degree of separation from the node 302 in the graph 300. The thread 312 may also determine identities of the neighbor nodes 304, 306, 308, and 310, and may generate a list of identities to include the identity of the node 302, and the identities of the neighbor nodes 304, 306, 308, and 310. In some embodiments, the thread 312 may generate a first hashed value based on the list of identities.

At step 515, the process 500 transmits the neighbor count and a first hashed value generated based on the list of identities to threads corresponding to the neighbor nodes. For example, the thread 312 may transmit the first neighbor count and the first hashed value to the threads 314, 316, 318, and 320 that correspond to the neighbor nodes 304, 306, 308, and 310, respectively. Similarly, the thread 312 may also receive neighbor counts and hashed values from the threads 314, 316, 318, and 320. Upon receiving the neighbor counts and the hashed values from the other threads, the thread 312 may compare the first neighbor count against the neighbor counts received from the other threads. Based on the comparing, the thread 312 may identify a first subset of the neighbor nodes having neighbor counts larger than the first neighbor count and a second subset of the neighbor nodes having neighbor counts smaller than the first neighbor count.

The process 500 then transmits (at step 520) the list to only a first subset of the neighbor nodes having larger neighbor counts than the first node, but not to a second subset of the neighbor nodes having less neighbor counts than the first node. For example, the thread 320 may be configured to transmit the list of identities generated for the node 310 to the thread 312 corresponding to the neighbor node 302 since the node 302 has a larger neighbor count (e.g., four) than the neighbor count of the node 310 (e.g., three), but not to the threads 314 and 318, corresponding to the neighbor nodes 304 and 308 since the nodes 304 and 308 have smaller neighbor counts (e.g., two) than the neighbor count of the node 310 (e.g., three). On the other hand, the thread 312 may determine not to transmit the list of identities to any threads corresponding to the neighbor nodes since none of its neighbor nodes 304, 306, 308, and 310 has a neighbor count larger than the first neighbor court.

The process 500 receives (at step 525) lists from threads corresponding to the second subset of the neighbor nodes and performs (at step 530) an action with respect to each of the neighbor nodes. For example, the thread 312 may perform an action with respect to the nodes 304, 306, 308, and 310 based on the neighbor counts, the hashed values, and/or the lists of identities received from the threads 314, 316, 318, and 320.

The process 500 determines (at step 535) whether the neighbor count received from another thread equals to the first neighbor count associated with the first node. If it is determined that the neighbor count received from another thread equals to the first neighbor count associated with the first node, the process 500 compares (at step 540) the first hashed value against a hashed value received from the thread corresponding to a neighbor node, and terminates (at step 545) the thread corresponding to the neighbor node if the first hashed value matches the received hashed value. For example, if it is determined that a hashed value received from a thread matches the first hashed value associated with the node 302, the thread 312 is configured to transmit a merge request to terminate the other thread.

The process 500 determines (at step 550) if the neighbor count received from another thread is less than the first neighbor count associated with the first node. If it is determined that the neighbor count received from the other thread is less than the first neighbor count, the process 500 compares (at step 555) the first list against the list received from the thread corresponding to a neighbor node, and terminates (at step 560) the thread corresponding to the neighbor node if the received list is a subset of the first list. For example, the thread 312 may receive a list of identities from the thread 320 corresponding to the neighbor node 310. The thread 312 may compare the first list of identities associated with the node 302, which comprises identities of the nodes 302, 304, 306, 308, and 310 against the list received from the thread 320, which comprises identities of the nodes 302, 304, 308, and 310. The thread 312 may determine that the list received from the thread 320 is a subset of the first list, and may transmit a merge request to the thread 320 to terminate the thread 320.

Figure 6:
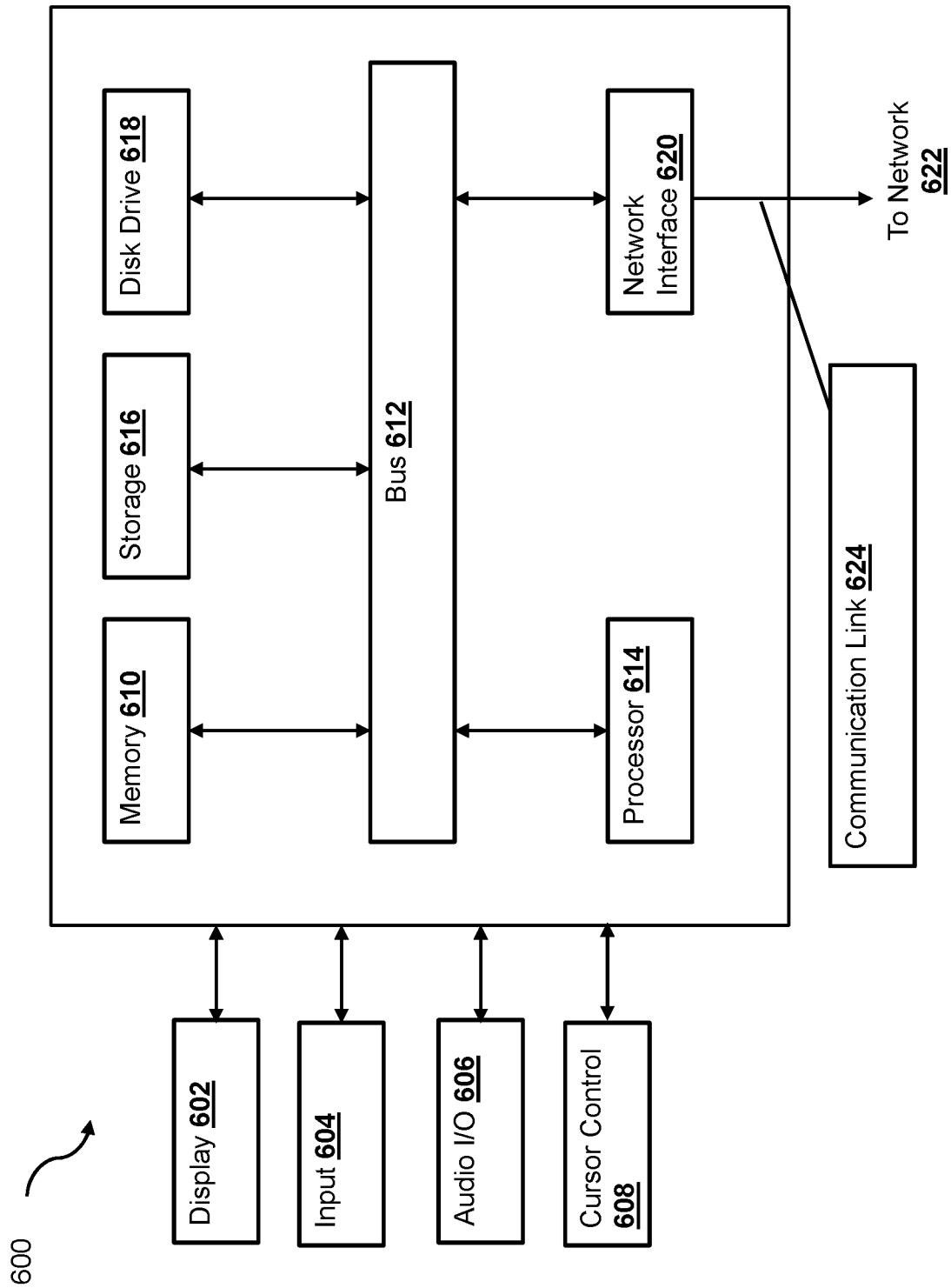
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130 and the user devices 110, 170, 180, and 190. In various implementations, each of the devices 110, 170, 180, and 190 may include a mobile cellular phone, personal computer (PC), laptop, wearable computing device, etc. adapted for wireless communication, and the service provider server 130 may include a network computing device, such as a server. Thus, it should be appreciated that the devices/servers 110, 130, 170, 180, and 190 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 804 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 620 transmits and receives signals between the computer system 600 and other devices, such as another user device, a merchant server, or a service provider server via a network 622, such as network 160 of FIG. 1. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the group detection functionalities described herein according to the processes 400 and 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:

accessing a graph comprising a plurality of nodes and a plurality of edges connecting the plurality of nodes, wherein each node in the plurality of nodes represents a user account with a service provider, and wherein for any particular two nodes in the graph, an edge that exists between the particular two nodes indicates at least one common account attribute between two user accounts represented by the particular two nodes;

configuring a plurality of threads to perform tasks related to a group detection process based on the plurality of nodes, wherein each thread in the plurality of threads corresponds to a distinct node in the plurality of nodes, and wherein each thread in the plurality of threads includes stored executable instructions configured to perform the tasks based on a corresponding node in the plurality of nodes;

determining, by a first thread from the plurality of threads that corresponds to a first node in the plurality of nodes, a first neighbor count representing a number of neighbor nodes having one degree of separation from the first node within the graph;

obtaining, a plurality of neighbor counts from a set of threads corresponding to the neighbor nodes of the first node;

determining, for the first node, a first subset of the neighbor nodes having first neighbor counts more than the first neighbor count and a second subset of the neighbor nodes having second neighbor counts less than the first neighbor count;

generating, by the first thread, a first list comprising a first identity of the first node and identities of the neighbor nodes of the first node; and transmitting, by the first thread, the first list to a first subset of the set of threads corresponding to the first subset of the neighbor nodes, but not a second subset of the set of threads corresponding to the second subset of the neighbor nodes.

2. The system of claim 1, wherein the operations further comprise:
receiving, by the first thread, one or more lists from the second subset of the set of threads;
determining, by the first thread, that at least one list received from a particular thread is a subset of the first list; and
in response to determining that the at least one list is a subset of the first list, terminating the particular thread.

3. The system of claim 1, wherein the operations further comprise:
transmitting a first group detection report to a group detection system, wherein the group detection report comprises the first list.

4. The system of claim 3, wherein the operations further comprise:
receiving one or more group detection reports comprising the first group detection report from one or more threads comprising the first thread; and
identifying from the plurality of nodes in the graph, one or more groups of related nodes based on the group detection reports.

5. The system of claim 3, wherein the operations further comprise:
identifying a first group of related nodes within the graph based on the first group detection report obtained from the first thread;
collectively analyzing activities conducted through user accounts represented by the first group of related nodes;
deriving a pattern based on the collectively analyzing the activities; and
performing an action associated with the user accounts based on the pattern.

6. The system of claim 5, wherein the action comprises reducing an access level associated with the user accounts.

7. The system of claim 5, wherein the action comprises providing an incentive to the user accounts.

8. The system of claim 1, wherein the operations further comprise:
generating a first hashed value based on the first list;
determining that a particular neighbor node from the neighbor nodes has a second neighbor count identical to the first neighbor count; and
determining whether the first node and the particular neighbor node belong to a same group by comparing the first hashed value against a second hashed value obtained from a second thread corresponding to the particular neighbor node.

9. The system of claim 8, wherein the operations further comprise:
in response to determining that the first node and the particular neighbor node belong to the same group, terminating the second thread.

10. A method comprising:
accessing, by one or more hardware processors, a graph comprising a plurality of nodes and a plurality of edges connecting the plurality of nodes, wherein each node in the plurality of nodes represents a user account with a service provider; and
instantiating, by the one or more hardware processors, a corresponding thread for each node in the plurality of nodes to perform tasks related to a group detection process, wherein a first corresponding thread corresponding to a first node in the plurality of nodes comprises executable instructions configured to:
determine a first set of nodes having one degree of separation from the first node;
determine, for the first node, a first neighbor count representing a first number of nodes within the first set of nodes;
identify, from the first set of nodes, a first subset of nodes and a second subset of nodes, wherein each node in the first subset of nodes has less neighbor nodes than the first node, and wherein each node in the second subset of nodes has more neighbor nodes than the first node; and
perform a neighbor node comparison between the first node and each of the first subset of nodes, but not the second subset of nodes.

11. The method of claim 10, wherein the executable instructions are further configured to:
generate a first list of identities comprising an identity of the first node and identities of the first set of nodes;
receive a second list of identities from a second thread corresponding to a second node in the graph; and
determine whether the second list of identities is a subset of the first list of identities.

12. The method of claim 11, wherein the executable instructions are further configured to:
in response to determining that the second list of identities is a subset of the first list of identities, cause the second thread to terminate.

13. The method of claim 10, further comprising:
identifying a first group of nodes within the graph based on the first node and the first set of nodes;

collectively analyzing activities conducted through user accounts represented by the first group of nodes;

deriving a pattern based on the collectively analyzing the activities; and performing an action associated with the user accounts based on the pattern.

14. The method of claim 10, wherein the action comprises reducing an access level associated with the user accounts.

15. A non-transitory machine-readable medium having stored thereon machine-readable instructions executable to cause a machine to perform operations comprising:

accessing a graph comprising a plurality of nodes and a plurality of edges connecting the plurality of nodes, wherein each node in the plurality of nodes represents a user account with a service provider;

instantiating a plurality of threads for performing tasks related to a group detection process based on the plurality of nodes, wherein each thread in the plurality of threads corresponds to a distinct node in the plurality of nodes, and wherein each thread in the plurality of threads includes stored executable instructions configured to perform the tasks based on a corresponding node in the plurality of nodes;

determining, by a first thread from the plurality of threads that corresponds to a first node in the plurality of nodes, a first neighbor count representing a number of neighbor nodes having one degree of separation from the first node within the graph;

obtaining, by the first thread, a plurality of neighbor counts from a set of threads corresponding to the neighbor nodes of the first node;

determining, by the first thread for the first node, a first subset of the neighbor nodes having first neighbor counts more than the first neighbor count and a second subset of the neighbor nodes having second neighbor counts less than the first neighbor count;

generating, by the first thread, a first list comprising a first identity of the first node and identities of the neighbor nodes of the first node; and transmitting, by the first thread, the first list to a first subset of the set of threads corresponding to the first subset of the neighbor nodes, but not a second subset of the set of threads corresponding to the second subset of the neighbor nodes.

16. The non-transitory machine-readable medium of claim 15, wherein the transmitting the first list to the first subset of the set of threads, but not the second subset of the set of threads, reduces required computer processing resources for performing the group detection process.

17. The non-transitory machine-readable medium of claim 15, wherein the operations further comprise:

generating, by the first thread, a first hashed value based on the first list;

determining, by the first thread, that a particular node from the neighbor nodes has a second neighbor count identical to the first neighbor count; and determining, by the first thread, whether the first node and the particular node belong to a same group by comparing the first hashed value against a second hashed value obtained from a second thread corresponding to the particular node.

18. The non-transitory machine-readable medium of claim 17, wherein the operations further comprise:

in response to determining that the first node and the particular node belong to the same group, terminating the second thread.

19. The non-transitory machine-readable medium of claim 1, wherein the operations further comprise:

determining one or more threads from the plurality of threads that have not been terminated;

retrieving one or more lists from the one or more threads; and identifying one or more groups within the graph based on the one or more lists received from the one or more threads.

20. The non-transitory machine-readable medium of claim 15, wherein the operations further comprise:

receiving, by the first thread, one or more lists from the second subset of the set of threads;

determining, by the first thread, that at least one list received from a particular thread is a subset of the first list; and in response to determining that the at least one list is a subset of the first list, terminating the particular thread.

* * * * *